United States Patent
Adams, Jr. et al.

(10) Patent No.: US 11,191,392 B2
(45) Date of Patent: Dec. 7, 2021

(54) VACUUM SEALED LID INSERT FOR INSULATED CONTAINER

(71) Applicant: Klean Kanteen, Inc., Chico, CA (US)

(72) Inventors: Richard John Adams, Jr., Bozeman, MT (US); Joshua James Birkle, Chico, CA (US)

(73) Assignee: KLEAN KANTEEN, INC., Chico, CA (US)

( * ) Notice: Subject to any disclaimer, the term of this patent is extended or adjusted under 35 U.S.C. 154(b) by 196 days.

(21) Appl. No.: 16/245,674

(22) Filed: Jan. 11, 2019

(65) Prior Publication Data

US 2019/0216264 A1  Jul. 18, 2019

Related U.S. Application Data

(60) Provisional application No. 62/617,008, filed on Jan. 12, 2018.

(51) Int. Cl.
*A47J 41/02* (2006.01)
*A47J 41/00* (2006.01)

(52) U.S. Cl.
CPC .......... *A47J 41/022* (2013.01); *A47J 41/0077* (2013.01)

(58) Field of Classification Search
CPC .......... B65D 39/00; B65D 39/08; A47J 41/00; A47J 41/02; A47J 41/022; A47J 41/028; A47J 41/0055; A47J 41/0072
See application file for complete search history.

(56) References Cited

U.S. PATENT DOCUMENTS

| | | | |
|---|---|---|---|
| 2,484,309 A | * | 10/1949 | Noeth ............... A47J 41/02 215/12.1 |
| 2,981,430 A | | 4/1961 | Tsien et al. |

(Continued)

FOREIGN PATENT DOCUMENTS

| | | |
|---|---|---|
| DE | 842251 C | 6/1952 |
| GB | 127164 A | 5/1919 |
| JP | 2001000339 A | 1/2001 |

OTHER PUBLICATIONS

ISA United States Patent and Trademark Office, International Search Report and Written Opinion Issued in Application Mo. PCT/US2019/013175, dated Mar. 15, 2019, WIPO, 8 pages.

(Continued)

*Primary Examiner* — Steven A. Reynolds
*Assistant Examiner* — Javier A Pagan
(74) *Attorney, Agent, or Firm* — Alleman Hall Creasman & Tuttle LLP

(57) ABSTRACT

An insulated container assembly, comprises a container body, including an inner wall and an outer wall coupled at a top of the container body and separated by a vacuum gap, and a lid that is reversibly attachable to the container body. The lid includes a vacuum insert; and a sleeve encompassing the vacuum insert, the sleeve configured to facilitate attachment of the lid to the container body, and further configured to generate a seal between the vacuum insert and the inner wall of the container body such that a base of the vacuum insert is exposed to a central cavity of the container body when the lid is fully attached to the container body. In this way, the entire central cavity may be surrounded by vacuum insulation, thus improving the thermal properties of the insulated container assembly.

14 Claims, 4 Drawing Sheets

(56) References Cited

U.S. PATENT DOCUMENTS

| | | |
|---|---|---|
| 4,655,355 A | 4/1987 | Turoff et al. |
| 2017/0119212 A1* | 5/2017 | Petrillo .................. A47J 41/02 |

OTHER PUBLICATIONS

European Patent Office, Extended European Search Report Issued in Application No. 19738336.7, dated Aug. 23, 2021, Germany, 8 pages.

* cited by examiner

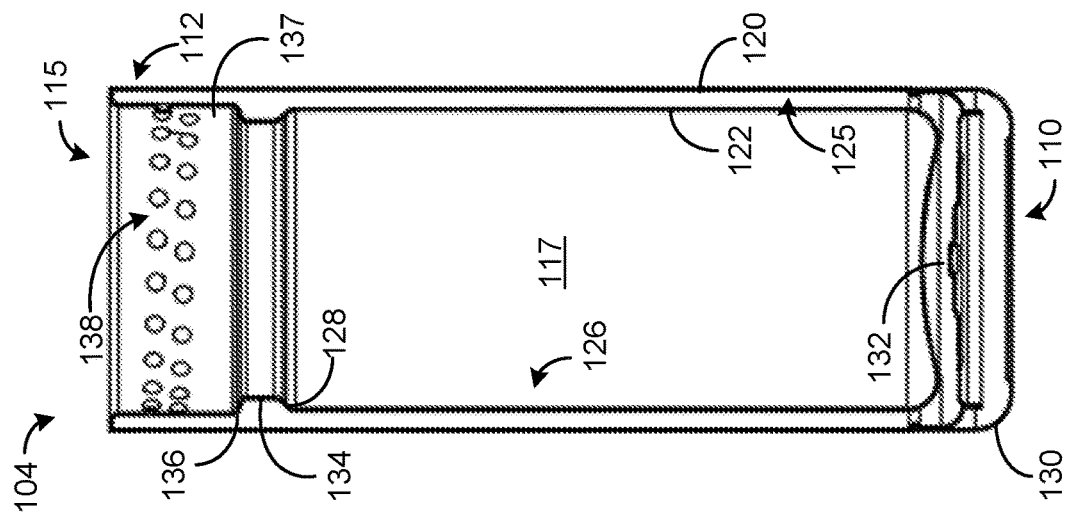
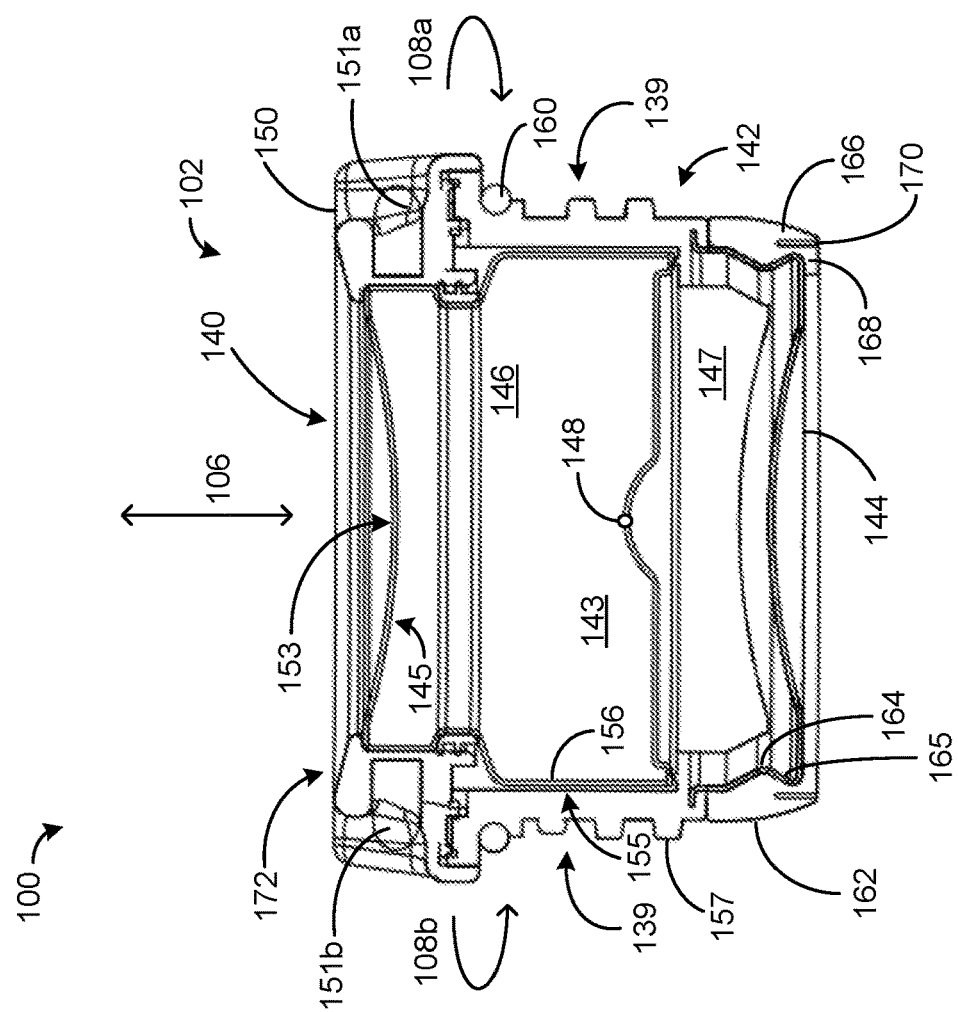
FIG. 1B
FIG. 1A

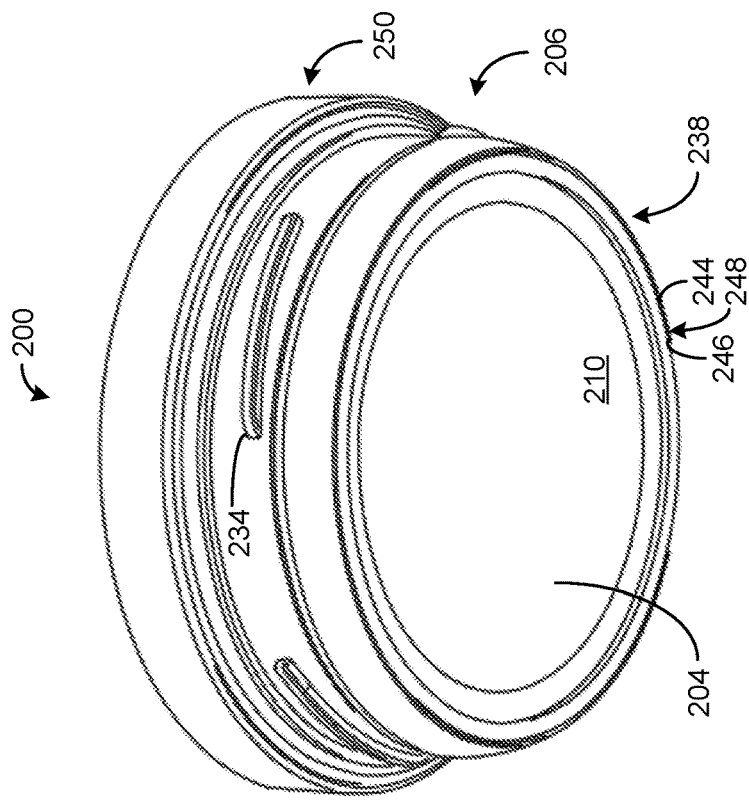
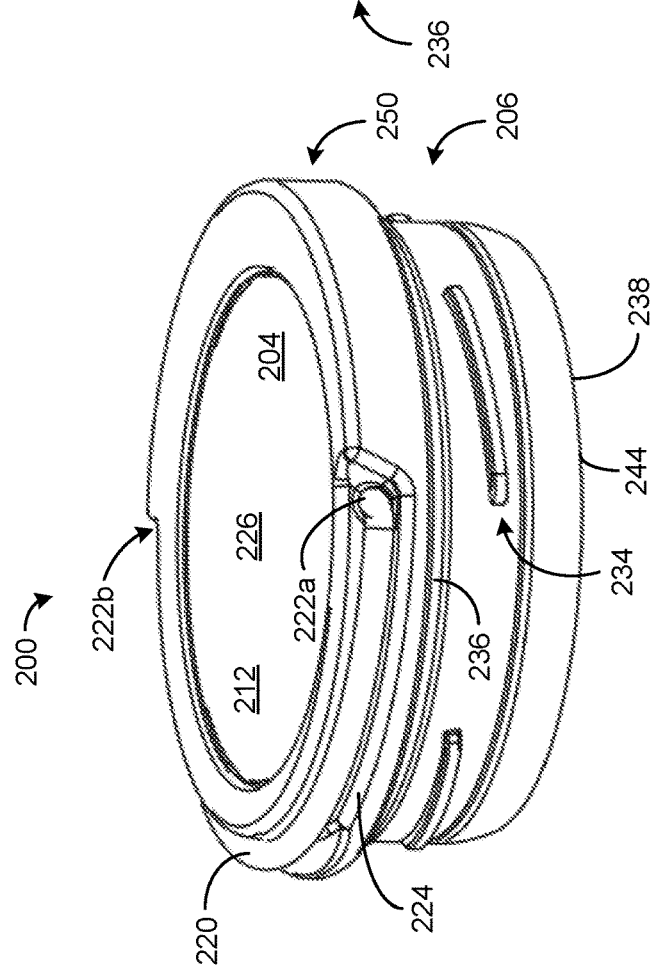

VACUUM SEALED LID INSERT FOR INSULATED CONTAINER

BACKGROUND

Containers can be used to store liquid and various other contents. Some containers are designed to maintain the temperature of their contents, be they hot or cold. Vacuum flasks are commonly used as insulating storage containers. Typically, two concentric containers are joined at the neck, and the intervening gap is at least partially evacuated of air. The vacuum gap reduces heat transfer between the container contents and the environment. However, vacuum flasks are still prone to heat transfer via their lids or sealing mechanisms which may act as heat sinks. As heated air or liquid contacts the lid of the flask, heat may be externally transferred via conduction and/or convection, cooling the container contents. Alternatively, if container is placed in an environment where the temperature is greater than that of the container contents, heat may be transferred into the container, warming the contents.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An insulated container assembly comprises a container body, including an inner wall and an outer wall coupled at a top of the container body and separated by a vacuum gap, and a lid that is reversibly attachable to the container body. The lid includes a vacuum insert and a sleeve encompassing the vacuum insert. The sleeve is configured to facilitate attachment of the lid to the container body, and to generate a seal between the vacuum insert and the inner wall of the container body such that a base of the vacuum insert is exposed to a central cavity of the container body when the lid is fully attached to the container body. In this way, the entire central cavity may be surrounded by vacuum insulation, thus improving the thermal properties of the insulated container assembly.

BRIEF DESCRIPTION OF THE DRAWINGS

FIG. 1A shows a cutaway view of an insulated lid including a sleeve and vacuum insert.

FIG. 1B shows a cutaway view of an insulated container body that is reversibly attachable to the lid depicted in FIG. 1A to form an insulated container assembly.

FIGS. 3A and 3B show perspective views of an additional vacuum sealed lid including a vacuum insert and sleeve.

FIGS. 1A, 1B, 2A, 2B, 3A, 3B, and 4 are drawn approximately to scale, however other relative dimensions may be used without departing from the scope of this disclosure.

DETAILED DESCRIPTION

Insulated containers, such as vacuum flasks, are designed to maintain the temperature of their contents over time. However, such containers are prone to thermal compromise via the interface between the container body and a lid. The lid may act as a heat sink, allowing undesired heat transfer in or out of the container. This may result in hastening equilibration of the temperature of the container contents with the temperature of the external environment.

This description details several examples for insulated container assemblies wherein the lid includes a vacuum sealed insert surrounded by a sleeve. When in place, the vacuum sealed insert provides a fully vacuum insulated container with increased thermal capabilities.

In some examples, both the vacuum sealed insert and the container body are fabricated from stainless steel. However, rather than coupling the steel components together directly, the sleeve facilitates the mating of the lid and the container body. This allows for the thermal and durability benefits of a vacuum sealed steel container without the concern of damaging or degrading the mating components that often occurs with steel-on-steel interfaces.

The sleeve may include one or more sealing elements which provide air-tight and liquid-tight coupling of the lid and container body. The seal may also provide feedback to the user, indicating that the lid is fully seated and tightened on the container body. In this way, the user may be confident that the internal contents of the insulated container assembly are sealed and thermally isolated from the environment.

Figure 2B:
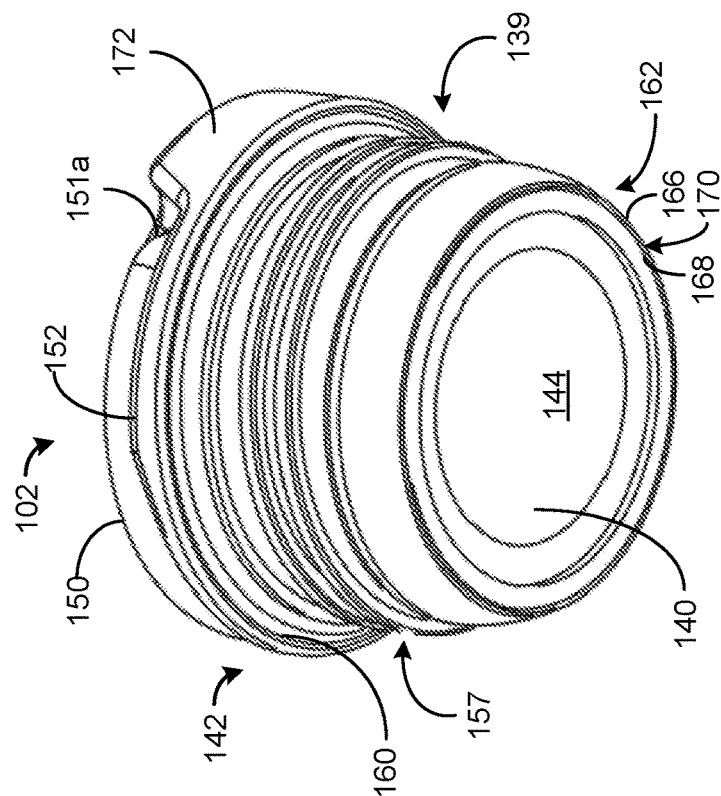
FIGS. 2A and 2B show perspective views of the lid depicted in FIG. 1A.
Figure 2A:
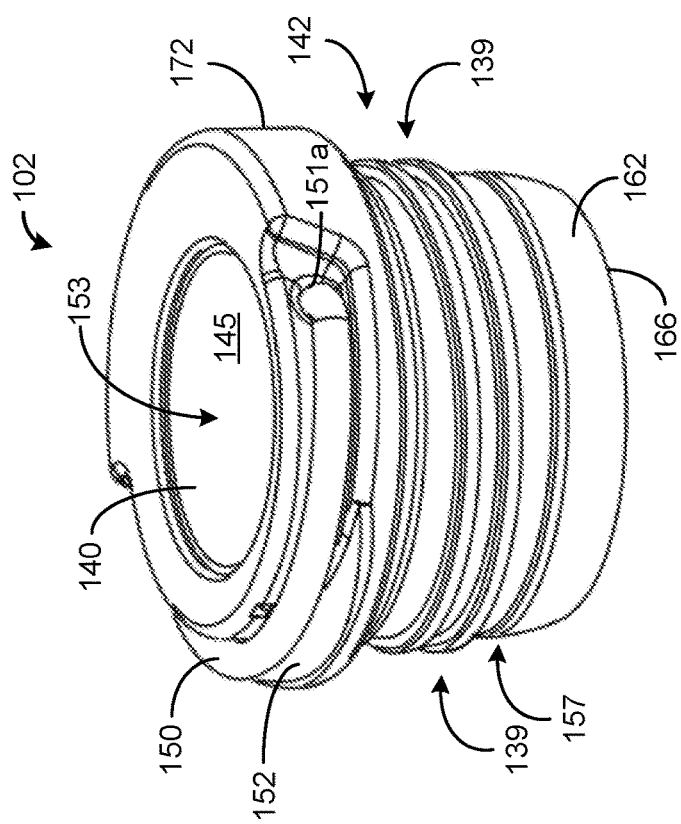

FIGS. 1A, 1B, 2A, and 2B show illustrations of components of insulated container assembly 100. Insulated container assembly 100 is configured to store liquids or other contents, and to sustain temperature differences between contents sealed within the assembly and the environment. Insulated container assembly 100 includes a lid 102 that is configured to reversibly couple to a container body 104 (i.e., configured to be selectively attached to and removed from the container body). FIG. 1 shows cutaway views of lid 102 and a container body 104. FIGS. 2A and 2B show perspective views of lid 102.

Rotation of lid 102 about a central axis 106 of lid 102 onto container body 104 (or vice-versa) may enable the insulated container assembly 100 to be closed and opened or partially opened such that lid 102 remains partially attached to container body 104. For instance, a user may screw lid 102 in a clockwise direction 108a to close insulated container assembly 100 and rotate lid 102 in a counterclockwise direction 108b to open or partially open insulated container assembly 100. However, other opening or closing techniques may be used in other examples.

FIGS. 1A and 1B illustrate one possible configuration for lid 102 and container body 104, though other configurations are possible. Alternate configurations are discussed herein with regard to FIGS. 3A, 3B, and 4. Container body 104 may be made from stainless steel, or any other suitable material for an insulated container assembly. Container body 104 includes a base 110 and a top 112. Top 112 includes an opening 115 which may be configured to receive lid 102. Opening 115 may provide access to central cavity 117 when lid 102 is not coupled to container body 104, allowing materials to be added to and/or withdrawn from container body 104.

Container body 104 is shown as a double-walled container. Container body 104 includes outer wall 120 and inner wall 122. Outer wall 120 and inner wall 122 may be coupled together at top 112. A vacuum gap 125 may separate outer wall 120 and inner wall 122.

Central cavity 117 includes a cylindrical region 126 that extends from base 110 to shoulder 128. As depicted in FIG. 1A, vacuum gap 125 may be uniform in width surrounding cylindrical region 126, and may be increased in width at base 110. In this example, base cap 130 is affixed on the exterior of vacuum portal 132. To achieve vacuum, vacuum gap 125 may be evacuated via vacuum portal 132, vacuum portal 132 sealed, and then base cap 130 applied to provide a smooth base 110 that allows container body 104 to rest upright on an even surface.

Inner wall 122 tapers at shoulder 128 to form collar 134, then widens in diameter at flare 136 to form neck 137. In this example, vacuum gap 125 may be increased in diameter between shoulder 128 and flare 136, and then may be decreased in width in the region surrounding neck 137.

At neck 137, inner wall 122 includes container mating complements 138. As depicted in FIG. 1, container mating complements 138 include sealing protrusions aligned in a thread path, though other configurations are possible, such as mating threads. Container mating complements 138 may be complimentarily configured to mate with lid mating complements 139 to allow lid 102 to be reversibly coupled to container body 104 at neck 137. In the depicted example, lid mating complements 139 include mating threads, though other configurations are possible, such as thread path sealing protrusions. The sealing protrusions within container mating complements 138 are shown arranged in a circumferential path (e.g., helical path) around inner wall 122. Specifically, the sealing protrusions may trace a path around the inner container surface that corresponds to a thread path within lid mating complements 139.

The complimentary thread paths facilitate tight and robust sealing between container body 104 and lid 102 when lid 102 is attached to (e.g., screwed onto) the container body 104. In the closed configuration, container mating complements 138 mate and seal with lid mating complements 139. In this way, liquid or other contents in container assembly 100 are sealed within the container body.

Container mating complements 138 are raised such that they extend inward, towards a central axis of container body 104. Specifically, in one example, the sealing protrusions may be aligned in a thread path and in the shape of a dome (e.g. hemispherical, semi-hemispherical, etc.). However, a variety of protrusion shapes may be used without departing from the scope of this disclosure. In other configurations, thread path-aligned sealing protrusions may be included within the lid mating complements, while the container mating complements include mating threads.

The complimentary mating complements facilitate tight and robust sealing between container body 104 and lid 102 when lid 102 is attached to (e.g., screwed onto) container body 104. To dispense liquids from container assembly 100, lid 102 may be partially unscrewed while remaining attached to container body 104. As a reduced amount of liquid may be trapped between the sealing protrusions of container mating complements 138 (as compared to a sealing thread path), the seal between lid 102 and container body 104 may be re-established when re-attached fully.

Lid 102 includes vacuum insert 140 and sleeve 142. Sleeve 142 may function to partially encompass vacuum insert 140 and to enable lid 102 to mate with and form a seal with container body 104. Vacuum insert 140 is depicted as being cylindrical, though other geometries have been contemplated. Vacuum insert 140 may be fabricated from stainless steel, from the same material as container body 104, and/or from any other suitable material. Vacuum insert 140 may include a vacuum cavity 143 that extends from insert base 144 to insert top 145. When mated with canister body 104 via sleeve 142, vacuum insert 140 thus functionally extends vacuum gap 125 so that vacuum insulation entirely surrounds the contents of central cavity 117. In this example, vacuum insert 140 includes an upper portion 146 and a lower portion 147 sandwiched around vacuum portal 148.

Sleeve 142 includes handle 150 (seen also in FIGS. 2A and 2B). As show in FIGS. 1A and 1B, handle 150 is in the form of a bale-type arch that spans the diameter of sleeve 142, and is rotatably movable around mounts 151a and 151b. As illustrated, handle 150 is in a stowed configuration resting on shelf 152 of sleeve 142. Alternately, handle 150 may be pivoted to an upright position, creating an opening between handle 150 and insert top 145. Vacuum insert 140 may include an indentation 153 within insert top 145. Indentation 153 thus increases the distance between insert top 145 and the bottom of handle 150, when handle 150 is in an upright position. This may improve the ability of a user to insert a finger, carabiner, etc. between handle 150 and vacuum insert 140, thus making insulated container assembly 100 more portable.

An interior surface 155 of sleeve 142 encompasses and interfaces with a sidewall 156 of vacuum insert 140. An exterior surface 157 of sleeve 142 may include lid mating complements 139, and may interface with inner wall 122 via container mating complements 138.

Sleeve 142 may include an upper seal 160 and a lower seal 162. In this example, lower seal 162 may be considered a primary seal, while upper seal 160 may be considered a secondary seal. Upper seal 160 is depicted as an O-Ring. Upper seal 160 may primarily act to center lid 102 on top 112. Upper seal may also provide feedback to a user as to when lid 102 is fully engaged with neck 134 (e.g., by increasing rotational friction).

Lower seal 162 may act to create a seal between vacuum insert 140 and flare 136. Lower portion 147 and adjacent portions of insert base 145 may be complementary to flare 136, including a narrowing region 164 and a flare-out region 165. Lower seal 162 includes an outer seal 166 and an inner seal 168. Outer seal 166 and inner seal 168 are separated by gap 170. Inner seal 168 is shaped to be flush with narrowing region 164 and flare-out region 165. Further, inner seal 168 may extend along the circumference of insert base 145, thereby preventing movement of vacuum insert 140 within sleeve 142.

When lid 102 is mated into neck 134, flare 136 forces outer seal 166 into and against inner seal 168, thus closing gap 170. In this way, lower seal 162 allows for gasket compression with minimal user effort. The compression of lower seal 162 provides pressure-based resistance feedback. Along with the seating of upper seal 160, and the mating of container mating complement 138 and lid mating complement 139, the resistance generated by compressing lower seal 162 allows for the user to ascertain/feel that lid 102 is properly in place.

When lid 102 is in place on container body 104, insulated container assembly 100 is fully vacuum insulated; the contents within central cavity 117 are not exposed to heat sink, save for any small band of inner seal 168 that extends around the circumference of insert base 145. As depicted, approximately 90% of the surface area of insert base 145 is exposed, but in other configurations, a larger or smaller percentage of insert base 145 may be exposed. As such, if both vacuum insert 140 and inner wall 122 are fabricated from the same material (e.g., stainless steel), nearly the entirety of central cavity 117 will be the same material when insulated container assembly 100 is assembled.

Vacuum insert 140 may be removable from sleeve 142. In this way, sleeve 142 may used or fabricated with other lid uses and designs that do not necessarily require vacuum insulation, such as inserts designed for the user to drink liquid contents from insulated container assembly 100. As shown in FIG. 1, lower seal 162 may be fabricated separately from the remainder of lid 102, allowing vacuum insert 140 to be sandwiched between the two lid pieces for assembly. In other examples, lower seal 162 may be contiguous with the rest of exterior surface 157. Vacuum insert 140 may be inserted into sleeve 142, from top to bottom, for example. The upper portion 172 of sleeve 142, including handle 150, shelf 152, etc. may then be positioned on top of the sleeve/insert subassembly to complete lid 102.

Sleeve 142 may be manufactured from a composite or polymeric material. For example, sleeve 142 may be manufactured from a plastic, such as polypropylene #5. Such a material is advantageous due to low cost, recyclability, heat resistance, resiliency, and pliability. With regard to lid mating complements 139, polypropylene #5 allows for smooth opening and closing and overall mating to container mating complements 138. Upper seal 160 may also be made of a composite or polymeric material, and could further be produced from natural or synthetic rubber, silicone, or other suitable materials.

While sleeve 142 itself could be made from stainless steel and contiguous with vacuum insert 140, steel-on-steel mating complements in some cases provide a rougher feel. Further, as steel is susceptible to dents and deformation over time, the uniformity of the seal could be reduced, thus impairing the insulation of the assembly. Separating out the vacuum insert and sleeve further enables a user to only replace one part or the other should the lid become compromised.

Figure 4:
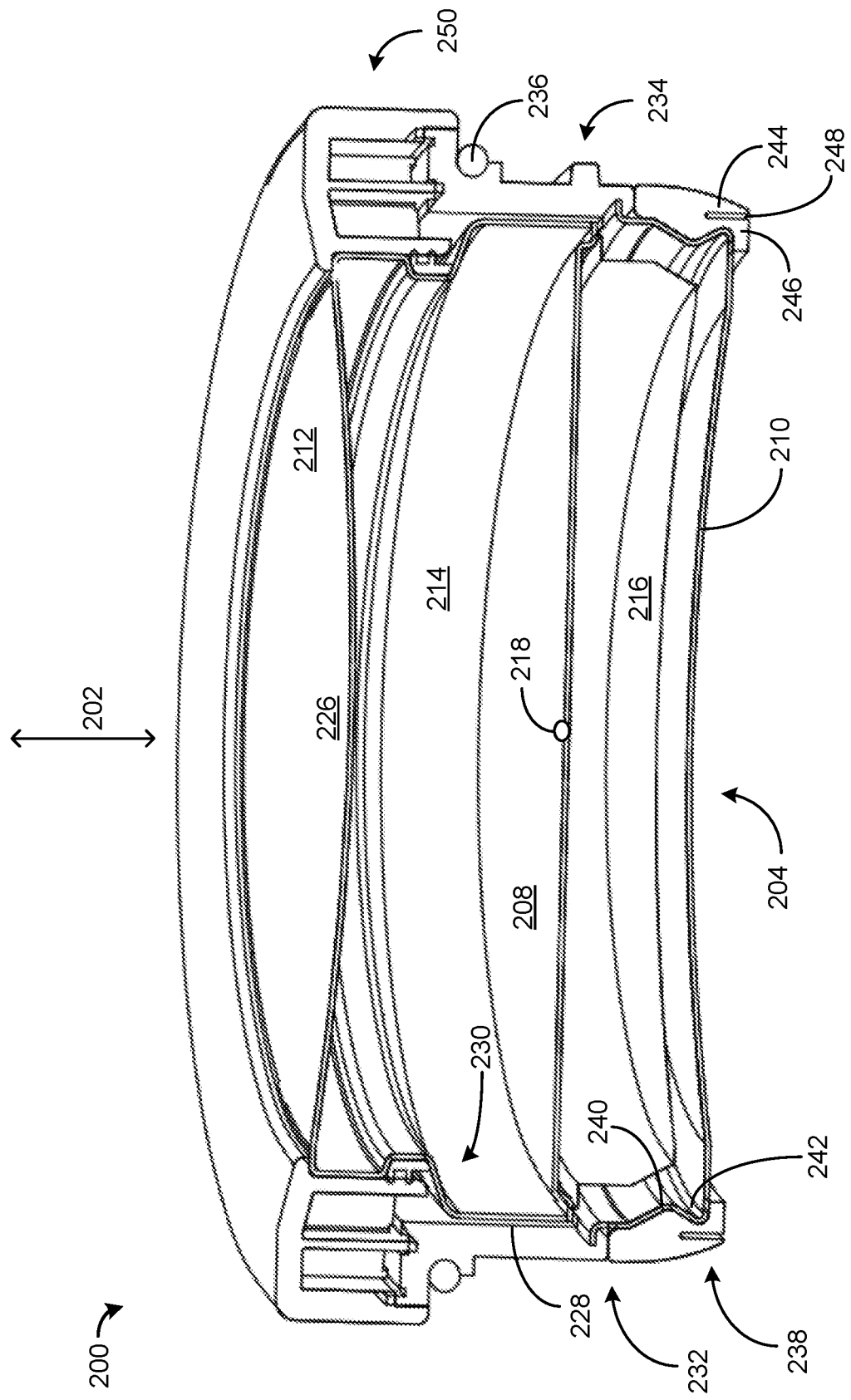
FIG. 4 shows a cutaway view of the vacuum sealed lid depicted in FIGS. 3A and 3B.

FIGS. 3A, 3B, and 4 show illustrations of components of an additional vacuum sealed lid 200. FIGS. 3A and 3B show perspective views of lid 200, while FIG. 4 shows a cutaway view of lid 200.

Lid 200 includes many of the features of lid 102, excepting for different relative dimensions. For example, lid 200 may be considered to be wider than lid 102. As such, lid 200 may be configured to mate with a container body that is wider and thus comprises a larger internal cavity as compared to container body 104. In this example, lid 200 is configured to mate to a container body via rotation around central axis 202. However, other opening or closing techniques may be used, in other examples.

Lid 200 includes vacuum insert 204 and sleeve 206. Sleeve 206 may function to partially encompass vacuum insert 204 and to enable lid 200 to mate with and form a seal with a container body. As described with regard to vacuum insert 140 and sleeve 142, vacuum insert 204 may be fabricated from stainless steel, and sleeve 206 may be fabricated from polypropylene #5. Vacuum insert 204 may include a vacuum cavity 208 that extends from insert base 210 to insert top 212. When lid 200 is mated with an insulated canister body via sleeve 206, vacuum insert 204 may function to extend a vacuum gap within the insulated canister body so that vacuum insulation entirely surrounds the contents of a central cavity of the canister assembly.

Vacuum insert 204 includes an upper portion 214 and a lower portion 216 sandwiched around vacuum portal 218. Vacuum insert 204 is depicted as being a stack of cylinders, though other geometries have been contemplated. In some examples, both upper portion 214 and lower portion 216 may be evacuated. However, in other examples, only lower portion 216 is evacuated. Vacuum insert 204 may be complementary to a central cavity 219 of sleeve 206. Sleeve 206 may be a multi-piece construction, whereby adjacent pieces are sandwiched around the upper and lower portions of vacuum insert 204. In this way, vacuum insert 204 may be securely held in place by sleeve 206.

Sleeve 206 includes handle 220. As show in FIG. 3A, handle 220 is in the form of a bale-type arch that spans the diameter of sleeve 206, and is rotatably movable around mounts 222a and 222b. As illustrated, handle 220 is in a stowed configuration resting on shelf 224 of sleeve 206. Vacuum insert 204 may include an indentation 226 within insert top 212. Indentation 226 thus increases the distance between insert top 212 and the bottom of handle 220, when handle 220 is in an upright position.

An interior surface 228 of sleeve 206 encompasses and interfaces with a sidewall 230 of vacuum insert 204. An exterior surface 232 of sleeve 206 may include lid mating complements 234, and may interface with container mating complements on an inner wall of a container body. In this example, lid mating complements 234 are depicted as mating threads, though other configurations are possible, such as sealing protrusions.

Sleeve 206 includes an upper seal 236 and a lower seal 238. Upper seal 160 is depicted as an O-Ring, though other configurations are possible. As described for lower seal 162, lower seal 238 may act to create a seal between vacuum insert 204 and a portion of an inner wall of a container body when lid 200 is fully attached to the container body. A lower region of vacuum insert 204, adjacent to insert base 210, may be complementary to an inner wall of a container body, including a narrowing region 240 and a flare-out region 242. Lower seal 238 includes an outer seal 244 and an inner seal 246 separated by a gap 248. Inner seal 246 is shaped to be flush with narrowing region 240 and flare-out region 242. Further, inner seal 246 may extend along the circumference of insert base 210, thereby preventing movement of vacuum insert 204 within sleeve 206. When lid 200 is in place on a container body, the resulting insulated container assembly thus is fully vacuum insulated. As depicted, approximately 92% of the surface area of insert base 210 is exposed, but in other configurations, a larger or smaller percentage of insert base 210 may be exposed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An insulated container assembly, comprising:
   a container body, including an inner wall and an outer wall coupled at a top of the container body and separated by a vacuum gap, the inner wall including an inner wall collar; and
   a lid that is reversibly attachable to the container body, the lid including:
      a vacuum insert including a base attached to a sidewall including a narrowing region and a flare-out region, the narrowing region and flare-out region complementary to the inner wall collar of the container body; and a sleeve encompassing the vacuum insert, the sleeve facilitating the reversible attachment of the lid to the container body such that the base of the vacuum insert is exposed to a central cavity of the container body when the lid is fully attached to the container body, the sleeve including a lower seal that compresses when engaged with the inner wall collar such that a seal is generated between the vacuum insert and the inner wall of the container body.

2. The insulated container assembly of claim 1, wherein the lower seal includes:

an inner seal that is complementary to a shape of the vacuum insert; and an outer seal that is separated from the inner seal by a gap.

3. The insulated container assembly of claim 1, wherein the sleeve further includes an upper seal configured to interface with the top of the container body when the lid is fully attached to the container body.

4. The insulated container assembly of claim 1, wherein the sleeve further includes a lid mating complement and the inner wall further includes a container mating complement.

5. The insulated container assembly of claim 4, wherein the lid mating complement includes a plurality of sealing protrusions, and wherein the container mating complement includes a mating thread.

6. The insulated container assembly of claim 4, wherein the container mating complement includes a plurality of sealing protrusions, and wherein the lid mating complement includes a mating thread.

7. The insulated container of claim 1, wherein the container body and the vacuum insert are both stainless steel.

8. The insulated container of claim 1, wherein the sleeve is manufactured from polypropylene #5.

9. The insulated container of claim 1, wherein at least 90% of a surface area of the base of the vacuum insert is exposed to the central cavity of the container body when the lid is fully attached to the container body.

10. An insulated lid for an insulated container, comprising: a vacuum insert including a base attached to a sidewall including a narrowing region and a flare-out region, the narrowing region and flare-out region complementary to the inner wall collar of a container body of the insulated container; and a sleeve encompassing the vacuum insert, the sleeve including a lower seal, the lower seal including an inner seal that is complementary to a shape of the vacuum insert, and an outer seal that is separated from the inner seal by a gap such that the sleeve is configured to facilitate attachment of the lid to the container body of the insulated container, and such that the lower seal is configured to compress when the lid is fully attached to the container body of the insulated container, configured to generate a seal between the vacuum insert and an inner wall of the container body such that the base of the vacuum insert is exposed to a central cavity of the container body when the lid is fully attached to the container body.

11. The insulated lid of claim 10, wherein the sleeve further includes an upper seal configured to interface with a top of the insulated container when the lid is fully attached to the container body.

12. The insulated lid of claim 10, wherein at least 90% of a surface area of the base of the vacuum insert is exposed to the central cavity of the insulated container when the lid is fully attached to the insulated container.

13. The insulated lid of claim 10, wherein the sleeve further includes lid mating complements that are complementary to container mating complements on the inner wall of the insulated container.

14. An insulated container assembly, comprising:

a container body, including an inner wall and an outer wall coupled at a top of the container body and separated by a vacuum gap, the inner wall including an inner wall collar; and a lid that is reversibly attachable to the container body, the lid including:

a vacuum insert; and a sleeve encompassing the vacuum insert, the sleeve facilitating the reversible attachment of the lid to the container body such that a base of the vacuum insert is exposed to a central cavity of the container body when the lid is fully attached to the container body, the sleeve including a lower seal that compresses when engaged with the inner wall collar such that a seal is generated between the vacuum insert and the inner wall of the container body, the lower seal including an inner seal that is complementary to a shape of the vacuum insert and an outer seal that is separated from the inner seal by a gap.

* * * * *